(12) United States Patent
Ray

(10) Patent No.: US 7,487,113 B2
(45) Date of Patent: Feb. 3, 2009

(54) SYSTEMS AND METHODS FOR PROVIDING ITEM SALES AND DELIVERY SERVICE

(75) Inventor: Christine R. L. Ray, Washington, DC (US)

(73) Assignee: United States Postal Service, Washington, DC (US)

(*) Notice: Subject to any disclaimer, the term of this patent is extended or adjusted under 35 U.S.C. 154(b) by 90 days.

(21) Appl. No.: 10/344,993

(22) PCT Filed: Sep. 6, 2001

(86) PCT No.: PCT/US01/27567

§ 371 (c)(1),
(2), (4) Date: Feb. 20, 2003

(87) PCT Pub. No.: WO02/21393

PCT Pub. Date: Mar. 14, 2002

(65) Prior Publication Data

US 2003/0208413 A1    Nov. 6, 2003

Related U.S. Application Data

(60) Provisional application No. 60/286,540, filed on Apr. 27, 2001, provisional application No. 60/230,798, filed on Sep. 7, 2000.

(51) Int. Cl.
*G06Q 30/00* (2006.01)
*G06Q 10/00* (2006.01)
*G06Q 40/00* (2006.01)
*G06Q 90/00* (2006.01)

(52) U.S. Cl. .............................. 705/26; 705/1; 705/35; 705/75

(58) Field of Classification Search .................. 705/26, 705/27, 39, 60, 1, 25, 35, 75
See application file for complete search history.

(56) References Cited

U.S. PATENT DOCUMENTS 5,794,207 A    8/1998   Walker et al.
5,835,896 A    11/1998  Fisher et al.
5,890,137 A    3/1999   Koreeda (Continued)

FOREIGN PATENT DOCUMENTS

WO    WO 02079935 A2  * 10/2002

OTHER PUBLICATIONS

PR Newswire, "CyberSource, UPS, and I-Escrow Form Alliances With Moai," New York, Nov. 19, 1999, p. 1.*

(Continued)

*Primary Examiner*—Yogesh C. Garg
*Assistant Examiner*—Amee A Shah
(74) *Attorney, Agent, or Firm*—Finnegan, Henderson, Farabow, Garrett & Dunner, L.L.P.

(57) ABSTRACT

A method and system for providing item sales and delivery service (see FIG. 1) consistent with the invention includes arranging over a communications system (170) a sales transaction of an item (110) between a seller (105) and a buyer (155), sending the item through a delivery system directed toward the buyer, and making a payment for at least one of the following: a purchase price of the item, a delivery fee, and a fee for any other buyer-selected delivery-related services.

40 Claims, 7 Drawing Sheets

U.S. PATENT DOCUMENTS

| | | | |
|---|---|---|---|
| 5,913,210 | A | 6/1999 | Call |
| 6,016,504 | A | 1/2000 | Arnold et al. ............... 709/200 |
| 6,064,979 | A | 5/2000 | Perkowski .................. 705/26 |
| 6,070,150 | A | 5/2000 | Remington et al. ........... 705/34 |
| 6,208,973 | B1 | 3/2001 | Boyer et al. .................. 705/2 |
| 6,260,024 | B1* | 7/2001 | Shkedy ........................ 705/37 |
| 6,269,343 | B1 | 7/2001 | Pallakoff |
| 6,839,690 | B1 | 1/2005 | Foth et al. |
| 6,865,559 | B2* | 3/2005 | Dutta ........................... 705/75 |
| 7,082,408 | B1 | 7/2006 | Baumann et al. |
| 2001/0029483 | A1 | 10/2001 | Schultz et al. |
| 2001/0037247 | A1* | 11/2001 | Haseltine ..................... 705/22 |
| 2001/0037290 | A1* | 11/2001 | Lai .............................. 705/39 |
| 2002/0010685 | A1 | 1/2002 | Ashby |
| 2002/0019777 | A1 | 2/2002 | Schwab et al. |
| 2002/0019785 | A1 | 2/2002 | Whitman |
| 2002/0069151 | A1 | 6/2002 | Casper |
| 2002/0073049 | A1 | 6/2002 | Dutta |
| 2002/0087461 | A1* | 7/2002 | Ganesan et al. ............... 705/39 |
| 2002/0120555 | A1 | 8/2002 | Lerner |
| 2002/0133466 | A1* | 9/2002 | Pugh ........................... 705/64 |
| 2002/0156700 | A1 | 10/2002 | Gray et al. |
| 2002/0161707 | A1 | 10/2002 | Cole et al. |
| 2003/0061164 | A1 | 3/2003 | Muhammad |
| 2003/0065557 | A1 | 4/2003 | Hoffman et al. |
| 2003/0195843 | A1* | 10/2003 | Matsuda et al. ............... 705/39 |
| 2003/0206720 | A1 | 11/2003 | Abecassis |
| 2004/0204994 | A1* | 10/2004 | Olson .......................... 705/14 |
| 2005/0171847 | A1 | 8/2005 | Ling |
| 2005/0177437 | A1* | 8/2005 | Ferrier ........................ 705/26 |

OTHER PUBLICATIONS iescrow.com, captured Dec. 2, 1998, via Wayback Machine, available at www.archive.org.*

Copending U.S. Appl. No. 10/476,000, filed Oct. 27, 2003.

* cited by examiner

SYSTEMS AND METHODS FOR PROVIDING ITEM SALES AND DELIVERY SERVICE

RELATED APPLICATION

Under provisions of 35 U.S.C. § 119(e), the Applicant claims the benefit of U.S. provisional application No. 60/230, 798, filed Sep. 7, 2000 and U.S. provisional application No. 60/286,540, filed Apr. 27, 2001, both of which are incorporated herein by reference.

TECHNICAL FIELD

The present invention relates to the field of providing item sales and delivery service. More particularly, the present invention, in various specific embodiments, involves methods and systems directed to arranging over a communication media a sales transaction and delivery of an item between a seller and a buyer.

BACKGROUND

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages. In the context of electronic commerce specifically where a seller has an item to sell and a buyer has a need for the item, the sale of the item my require facilitation from a third party for financial arrangements or for delivery of the item. For example, if the agreement to sell the item is done remotely between a seller and buyer who are complete strangers or otherwise have no trust in the other party's ability to perform their respective portions of the bargain, a trusted third party may provide a means to transfer payment for the item or to provide delivery of the item.

Therefore, the need to efficiently provide item sales and delivery service has become a common need for the United States Postal Service and many other organizations. More specifically, efficiently arranging over a communication media a sales transaction and delivery of an item between a seller and a buyer has become a critical service for many delivery system operators. This is because in an increasingly competitive environment, meeting and exceeding the expectations of those who receive a service is essential for a service provider.

One solution to the item sales and delivery service problem is for the seller and buyer to use a person-to-person payment system, for example, over the Internet. In this situation, a buyer agrees to buy an item online from another individual, for example, at an online auction site. After the agreement as to the sale is made, the buyer must send a payment to the seller. Typically, the person-to-person payment system handles in the background the payment transaction, for example, a debit to the customer and a credit to the seller via credit card. Once the seller's account is credited, the person-to-person payment system can notify the seller via email that the person-to-person payment system has the money. In a normal a person-to-person payment system, this is the end of the procedure.

Great inefficiencies are created in this procedure because, for example, the delivery component of the procedure is not coordinated with the financial aspects of the procedure. Accordingly, efficiently providing item sales and delivery service remains an elusive goal. Thus, there remains a need for efficiently providing item sales and delivery service. In addition, there remains a need for efficiently arranging over a communication media a sales transaction and delivery of an item between a seller and a buyer.

SUMMARY OF THE INVENTION

In accordance with the current invention, an item sales and delivery service methods and systems are provided that avoid the problems associated with prior art item sales and delivery service methods and systems as discussed herein above.

In one aspect, a method for providing item sales and delivery service consistent with the invention includes arranging over a communications system a sales transaction of an item between a seller and a buyer, sending the item through a delivery system directed toward the buyer, and making a payment for at least one of the following: a purchase price of the item, a delivery fee, and a fee for any other buyer-selected delivery-related services.

In another aspect, a system for providing item sales and delivery service comprises a component for arranging over a communications system a sales transaction of an item between a seller and a buyer, a component for sending the item through a delivery system directed toward the buyer, and a component for making a payment for at least one of the following: a purchase price of the item, a delivery fee, and a fee for any other buyer-selected delivery-related services.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Figure 1:
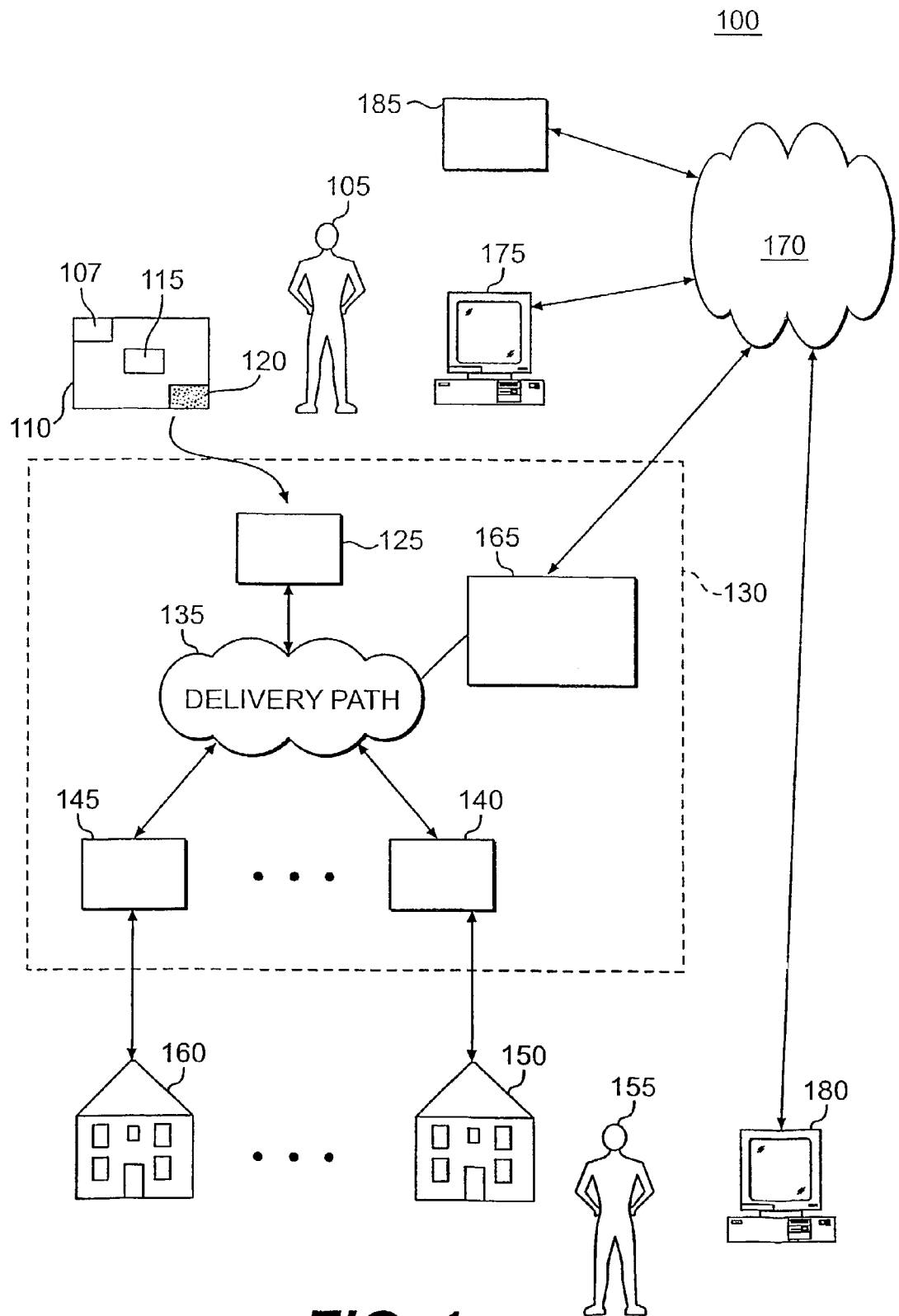
FIG. 1 is a functional block diagram of a system for providing item sales and delivery service consistent with the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Referring to FIG. 1, an embodiment of the present invention provides an item sales and delivery service system 100. For example, a buyer 155 may elect to purchase an item 110 from a seller 105. In arranging this purchase, a communications system 170, for example, the Internet, may be employed to facilitate buyer 155 and seller 105 agreeing to item 110 and a price for item 110. An online auction site, for example, may be used for this function. In addition to this type of arrangement, buyer 155 may elect to pay for the purchase and delivery of item 110 using a person-to-person system 185, also utilizing communications system 170. In this example, in order to pay for item 110, buyer 155 may authorize person-to-person system 185 to transfer payment from a buyer account; the payment including a purchase price of item 110, a delivery fee, and a fee for other buyer-selected delivery-related services.

Person-to-person system 185 may then debit the buyer account in the amount of the payment and place the payment debited from the buyer account into an escrow account. Person-to-person system 185 may then send a notice, for example, an email, to seller 105 over communications system 170 indicating that item 110 can be shipped. After the delivery system operator notifies person-to-person system 185 over communications system 170 that the item 110 has been delivered, person-to-person system 185 then makes a payment for at least one of the following: the purchase price of item 110, the delivery fee, and the fee for any other buyer-selected delivery-related services. Specifically, if buyer 155 decides after receipt not to keep item 110, person-to-person system 185 may then make the payment of the purchase price of the item 110 to buyer 155. If buyer 155, however, decides after receipt to keep item 110, person-to-person system 185 may then make the payment of the purchase price of item 110 to seller 105. In any event, the delivery fee and the fee for any other buyer-selected delivery-related services are paid by person-to-person system 185 to a delivery system operator.

In the item sales and delivery process, seller 105 places item 110 into a delivery system 130. Item 110 contains a label 115 indicating a first address 150 of buyer 155 and a return address 107 indicating where to return item 110 if necessary. Item 110 also contains a tracking indicia 120 identifying the sales transaction, relating seller 105 and buyer 155. Tracking indicia 120 may be placed on item 110 by seller 105 or the delivery system operator.

Item 110 is routed through delivery system 130, which comprises a seller plant 125, a delivery path 135, a first address plant 140, an alternative address plant 145, and an alternative processing point 165. Delivery path 135 comprises a plurality of plants similar to seller plant 125, first address plant 140, and alternative address plant 145. The plants within delivery path 135 contain, among other things, automated systems and sorting equipment and are designed to receive and process a plurality of items. Delivery system 130 is configured to sense tracking indicia 120 placed on Item 110 as it passes through the elements of delivery system 130 directing the movement of item 110 through delivery system 130. In addition to facilitating the tracking of item 110 through delivery system 130, tracking indicia 120 identifies the sales transaction and relates buyer 155 and seller 105.

Tracking indicia 120 may comprise a bar code or a PLANET code. A bar code is a printed code used for recognition by a bar code scanner (reader). Traditional one-dimensional bar codes use the bar's width to encode a product or account number. Two-dimensional bar codes, such as PDF417, MAXICODE and DATAMATRIX, are scanned horizontally and vertically and hold considerably more data. Generally, PDF417 is widely used for general purposes, MAXICODE is used for high-speed sorting, and DATAMATRIX is used for marking small parts.

Historically, system operators sorted flat mail using POSTNET, a 12-digit barcode consisting of alternating long and short bars indicating the destination of, for example, a mailpiece. Responding to the expanding needs of users, particularly heavy volume users, PLANET code was developed on the foundation of the existing technical infrastructure. The PLANET Code is the opposite of the current POSTNET codes, reversing long bars for short and short bars for long. This innovation offers the convenience of a bar code that is easily applied using current bar-coding methods, and is readily scanned by the high-speed automation equipment already located in the plurality of plants comprising delivery system 130.

In the item sales and delivery service, item 110 is sent through delivery system 130 by seller 105 to first address plant 140. At anytime in the delivery process a determination may be made as to whether item 110 is undeliverable. If it is determined that item 110 is undeliverable, item 110 may be forwarded to alternative processing point 165 where an ancillary service may be performed. Examples of such ancillary services are recycle service (treating item 110 as waste), NIXIE service, and Computerized Forwarding Service (CFS).

With respect to NIXIE service, NIXIE is a classification given to an item that cannot be sorted or is undeliverable-as-addressed because of an incorrect, illegible, or insufficient delivery address. If item 110 is undeliverable-as-addressed, address correction service (re-label with a correct address) or return service (return item to the sender) may be performed. In this case, a NIXIE operator specialized in the handling of such items is required. If item 110 requires return service, return address 107 on item 110 is read and item 110 is sent to return address 107 accordingly. Return address 107 is an element of item 110 that is usually placed in the upper left corner of item 110 to indicate the address of seller 105. This address indicates where seller 105 wants item 110 returned if it is undeliverable. In addition return address 107 may indicate where seller 105 will receive a bill for any fees due for the return of item 110. When item 110 requires address correction service, a NIXIE operator obtains the proper address of buyer 155 or the reason for non-delivery. While NIXIE processing may comprise address correction service or return service, those skilled in the art will appreciate that may other types of NIXIE processing may be performed.

Computerized forwarding service is a centralized, computerized address label-generating operation that forwards undeliverable-as-addressed items to buyers. In this case, buyer 155 may pre-register an alternative address 160 of buyer 155 with the delivery system operator in order to have all items forwarded to alternative address 160. For example, if buyer 155 moves and wishes to have items sent to alternative address 160, buyer 155 notifies the delivery system operator of alternative address 160. Once the delivery system operator is notified of alternative address 160, all items sent to first address 150 are detected by delivery system 130, re-labeled, and then forwarded to alternative address 160. In the aforementioned computerized forwarding service, items are forwarded only for a specific period of time. The delivery system operator expects buyer 155 to contact each and every seller who buyer 155 may expect to receive an item and notify the possible sellers of the address change of buyer 155. After the computerized forwarding service time period is complete, the delivery system operator will cease forwarding items to buyer 155 and will return to the seller 105 all items sent to first address 150.

If ancillary services were required, item 110 may remain at alternative processing point 165 or may be processed at an item recovery section of alternative processing point 165. Item 110 may be recovered by seller 105 or buyer 155 upon the completion of a tracer. A tracer is a form completed by seller 105 or buyer 155 to locate delayed or undelivered items. While item recovery may occur at alternative processing point 165, those skilled in the art will appreciate that may other types of processing may be performed at alternative processing point 165. While person-to-person system 185 is shown to be separate from delivery system 130, the functionality of person-to-person system 185 may be performed under the control of the delivery system operator at alternative processing point 165, at any point within delivery system 130 or at any point outside delivery system 130.

Still referring to FIG. 1, person-to-person system 185, the delivery system operator, seller 105 and buyer 155 may communicate with each other over communications system 170. In the present embodiment, preferred methods of the invention utilize a seller computer 175, buyer computer 180, delivery system operator computer (not shown), and person-to-person system computer (not shown) contained within person-to-person system 185. These computers are typically personal computer or other similar microcomputer-based workstation. Those skilled in the art, however, will appreciate that seller computer 175, buyer computer 180, delivery system operator computer, and person-to-person system computer may comprise any type of computer operating environment such as hand-held devices, multiprocessor systems, microprocessor-based or programmable consumer electronics, minicomputers, mainframe computers, and the like. These computers may also be implemented in distributed computing environments where tasks are performed by remote processing devices and have the capability of connecting to communications system 170. If the Internet is utilized as communications system 170, this connection can be made utilizing e-mail generally through the use of a standard e-mail software package such as Microsoft Corporation's OUTLOOK or GROUPWISE marketed by Novell, Inc. In this example where communications system 170 is the Internet, any notices, arrangements, communications, or general exchange of information may be accomplished via e-mail. Seller computer 175, buyer computer 180, the delivery system operator computer, and the person-to-person system computer may connect to the Internet through an Internet service provider (ISP) (not shown) in the manner known to those skilled in the art. In addition to Internet based e-mail, person-to-person system 185, the delivery system operator, seller 105 and buyer 155 may communicate over communications system 170 utilizing regular mail, facsimile, web pages, or an interactive voice response systems. Those skilled in the art will appreciate that many other types of communications system 170 may be used.

In addition to utilizing a wire line communications system 170, a wireless communications system 170, or a combination of wire line and wireless may be utilized in order to exchange e-mails via the Internet or for utilizing other communications media. Wireless can be defined as radio transmission via the airwaves, however, those skilled in the art will appreciate that various other communication techniques can be used to provide wireless transmission including infrared line of sight, cellular, microwave, satellite, packet radio and spread spectrum radio. Seller computer 175, buyer computer 180, delivery system operator computer and person-to-person system computer in the wireless environment can be any mobile terminal such as a smart phone, personal digital assistant (PDA), intelligent pager, portable computer, hand held computer, or any device capable of receiving wireless data. Wireless data may include, but is not limited to, paging, text messaging, e-mail, Internet access and other specialized data applications specifically excluding voice transmission. A PDA is a handheld computer that serves as an organizer for personal information. It generally includes at least a name and address database, to-do list and note taker. PDAs are typically pen based and use a stylus to tap selections on menus and to enter printed characters. The unit may also include a small on-screen keyboard which is tapped with the pen. Data may be synchronized between the PDA and a desktop computer through a cable or wireless transmissions.

Figure 2:
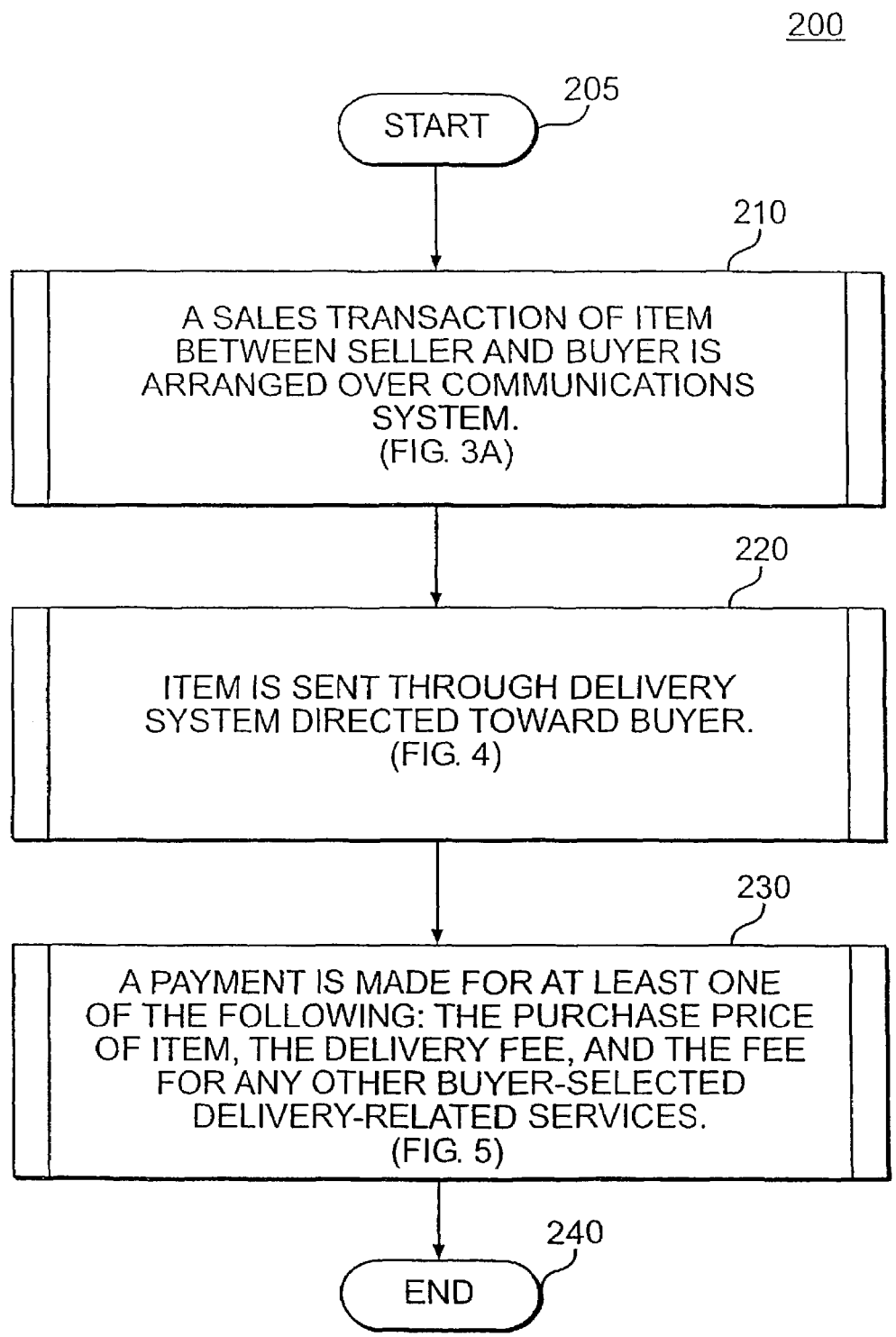
FIG. 2 is a flow chart of an exemplary method for providing item sales and delivery service consistent with the present invention.
Figure 3A:
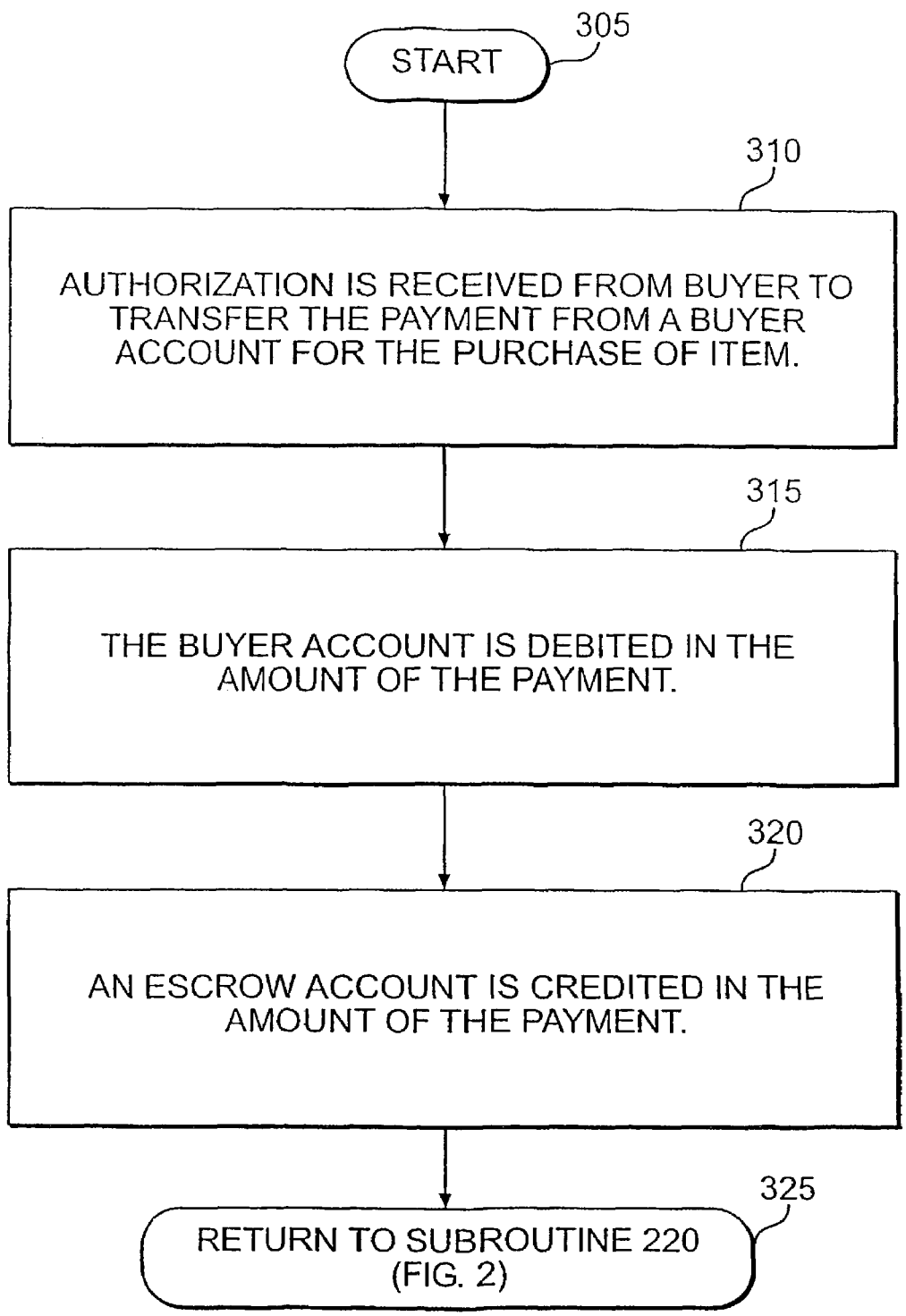
FIG. 3A is a flow chart of an exemplary subroutine used in the exemplary method of FIG. 2 for arranging a sales transaction of an item between a seller and a buyer over a communications system.
Figure 3B:
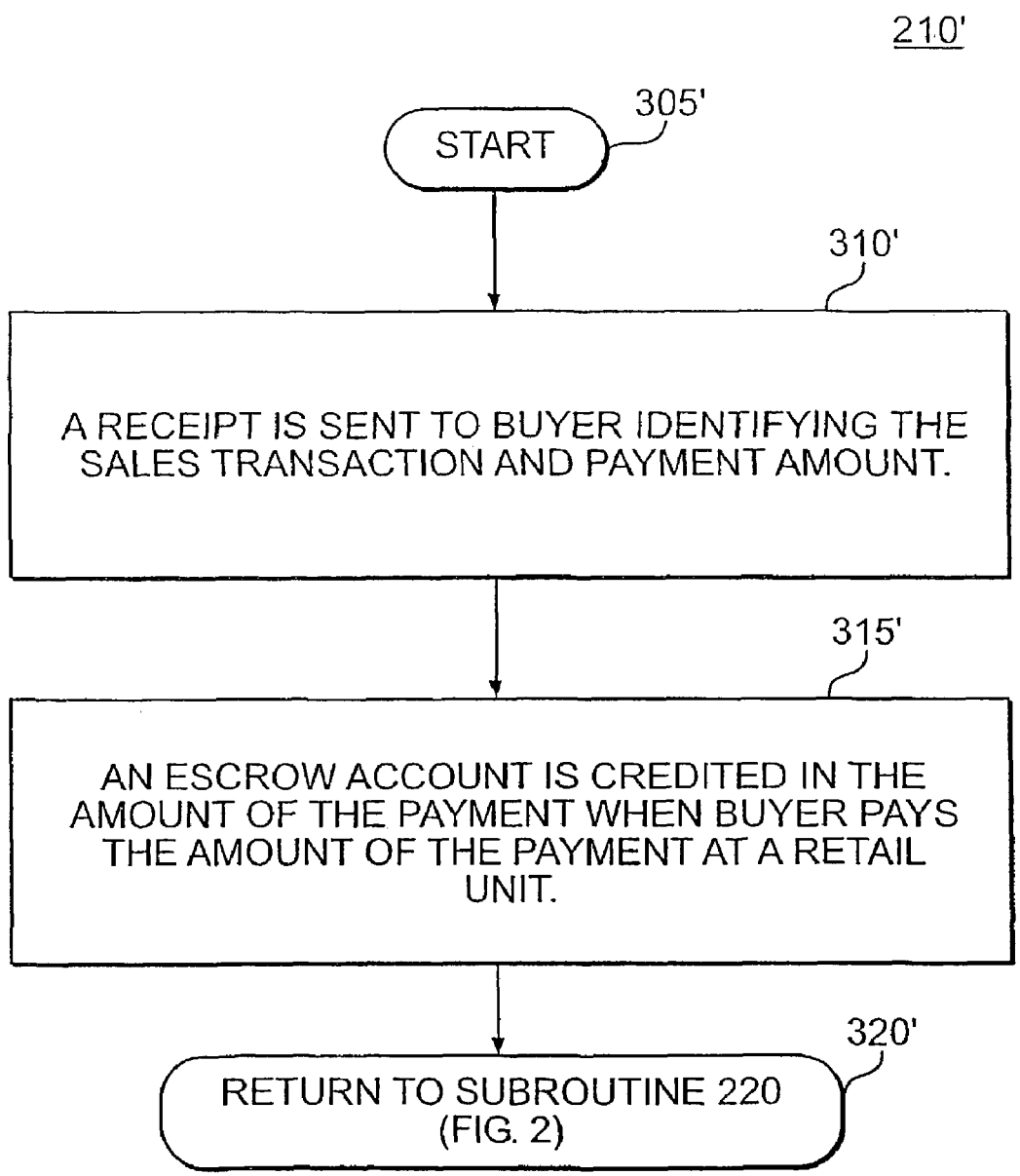
FIG. 3B is a flow chart of an alternate embodiment of the exemplary subroutine of FIG. 3A used in the exemplary method of FIG. 2 for arranging a sales transaction of an item between a seller and a buyer over a communications system.

FIG. 2 is a flow chart setting forth the general stages involved in an exemplary method 200 for providing item sales and delivery service. The implementation of the stages of exemplary method 200 in accordance with an exemplary embodiment of the present invention will be described in greater detail in FIG. 3 through FIG. 5. Exemplary method 200 begins at starting block 205 and proceeds to exemplary subroutine 210 where a sales transaction of item 110 between seller 105 and buyer 155 is arranged over communications system 170. The stages of exemplary subroutine 210 are shown in FIG. 3A and the stages of an alternative embodiment of subroutine 210, subroutine 210', are shown in FIG. 3B. The stages of these subroutines will be described in greater detail below.

Figure 4:
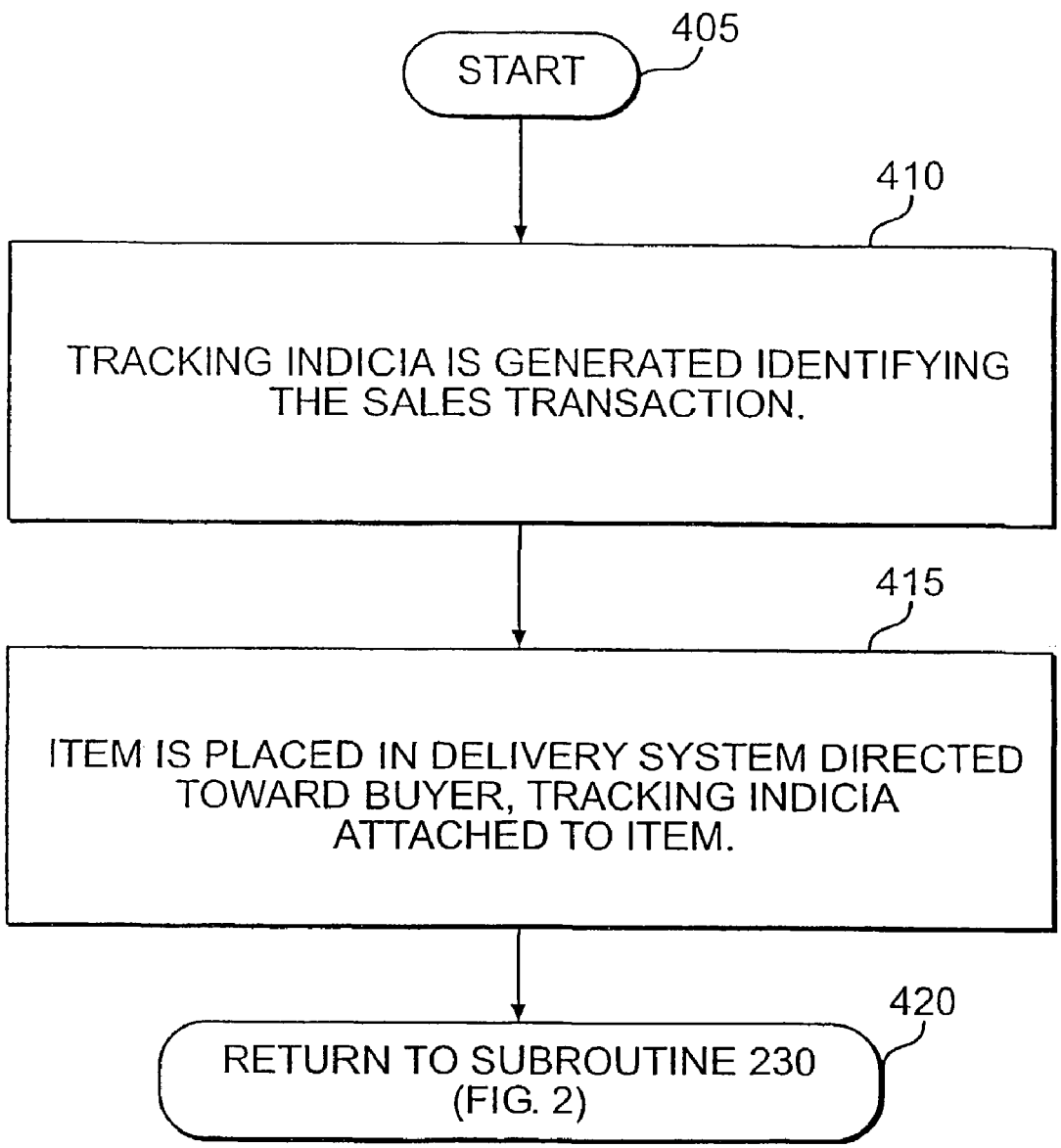
FIG. 4 is a flow chart of an exemplary subroutine used in the exemplary method of FIG. 2 for sending an item through a delivery system directed toward a buyer.

From exemplary subroutine 210 where a sales transaction of item 110 between seller 105 and buyer 155 is arranged over communications system 170, exemplary method 200 advances to exemplary subroutine 220 where item 110 is sent through delivery system 130 directed toward buyer 155. The stages of exemplary subroutine 220 are shown in FIG. 4 and will be described in greater detail below.

Figure 5:
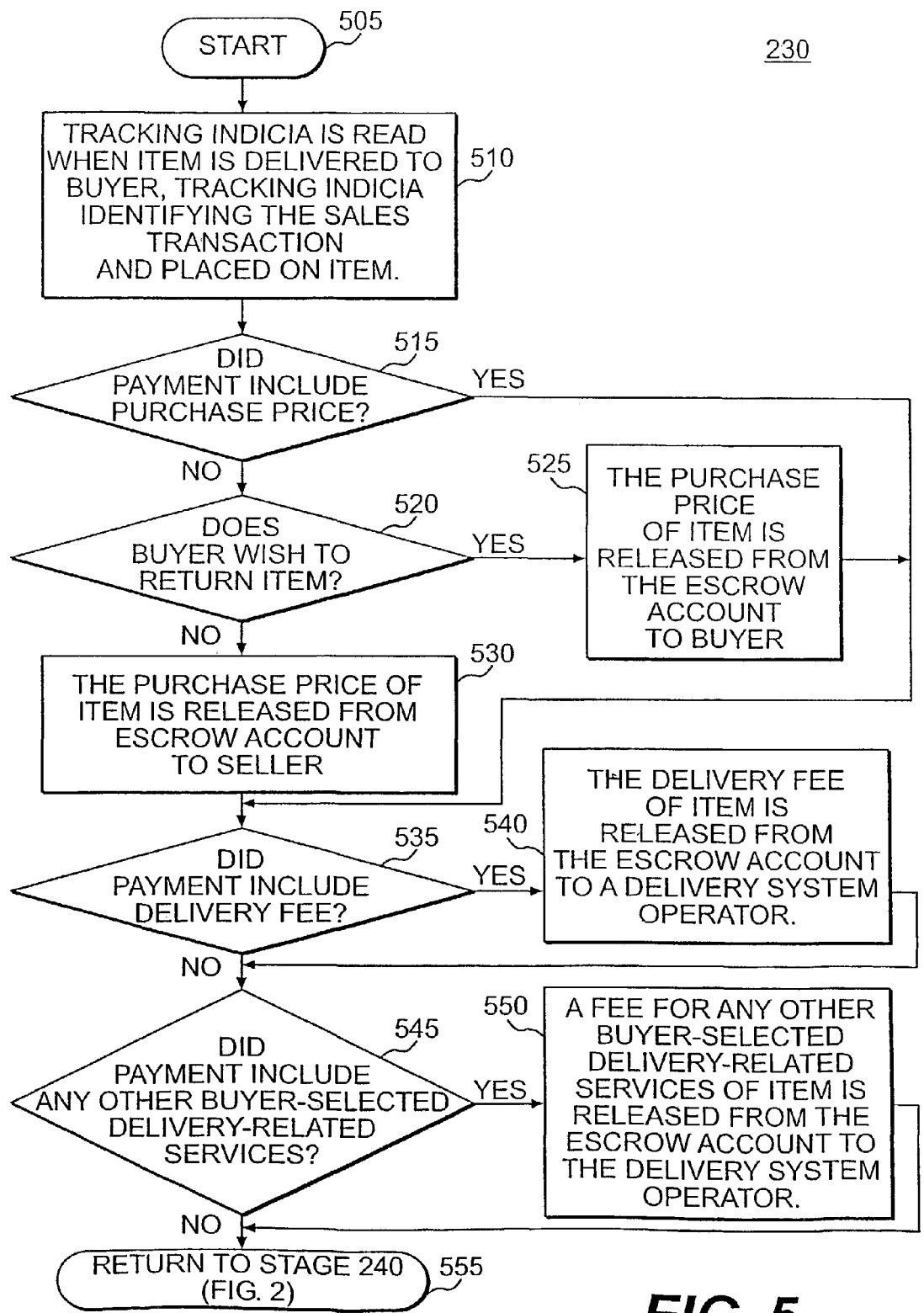
FIG. 5 is a flow chart of an exemplary subroutine used in the exemplary method of FIG. 2 for making a payment for at least one of the following: a purchase price of an item, a delivery fee, and a fee for any other buyer-selected delivery-related services.

Once item 110 is sent through delivery system 130 directed toward buyer 155 in exemplary subroutine 220, exemplary method 200 continues to exemplary subroutine 230 where a payment is made for at least one of the following: the purchase price of item 110, the delivery fee, and the fee for any other buyer-selected delivery-related services. The stages of exemplary subroutine 230 are shown in FIG. 5 and will be described in greater detail below.

Once a payment is made for at least one of the following: the purchase price of item 110, the delivery fee, and the fee for any other buyer-selected delivery-related services in exemplary subroutine 230, exemplary method 200 ends at stage 240.

Arrangement of Sales Transaction

FIG. 3A describes exemplary subroutine 210 from FIG. 2 in which a sales transaction of item 110 between seller 105 and buyer 155 is arranged over communications system 170. Exemplary subroutine 210 begins at starting block 305 and advances to stage 310 where authorization is received from buyer 155 to transfer the payment from a buyer account for the purchase of item 110. The buyer account transfer operation may comprise billing buyer; debiting buyer's checking account, credit card account, or debit card account; or receiving cash from buyer 155.

After authorization is received from buyer 155 to transfer the payment from the buyer account for the purchase of item 110 in stage 310, exemplary subroutine 210 advances to stage 315 where the buyer account is debited in the amount of the payment. Once the buyer account is debited in the amount of the payment in stage 315, exemplary subroutine 210 continues to stage 320 where an escrow account is credited in the amount of the payment.

From stage 320 where the escrow account is credited in the amount of the payment, exemplary subroutine 210 advances to stage 325 and returns to exemplary subroutine 220 of FIG. 2.

Item is Sent Through Delivery System

FIG. 4 describes exemplary subroutine 220 from FIG. 2 in which item 110 is sent through delivery system 130 directed toward buyer 155. Exemplary subroutine 220 begins at starting block 405 and advances to stage 410 where tracking indicia 120 is generated identifying the sales transaction and relates buyer 155 and seller 105. This generation of tracking indicia 120 occurs when a notice is received by seller 105 over communications system 170 that the sales transaction has been arranged. As stated above, tracking indicia 120 may comprise a bar code or a PLANET code. In addition to tracking indicia 120, label 115 indicating first address 150 of buyer 155 and return address 107 indicating where to return item 110 if necessary, may also be generated at this time.

After tracking indicia 120 is generated identifying the sales transaction in stage 410, exemplary subroutine 220 advances to stage 415 where item 110 is placed in delivery system 130 directed toward buyer 155 with tracking indicia 120 attached to item 110. Delivery system 130 comprises seller plant 125, delivery path 135, first address plant 140 and alternative address plant 145. Delivery path 135 comprises a plurality of plants similar to seller plant 125, first address plant 140 and alternative address plant 145. The plants within delivery system 130 may contain, among other things, automated systems and sorting equipment located at a plurality of locations. In executing their function, the plants comprising delivery system 130 process item 110 by checking address label 115 placed on item 110. Item 110 is then routed to the next most appropriate plant in delivery system 130. The appropriateness of the next plant in delivery system 130 depends upon the present location of item 110 in delivery system 130 and where item 110 is addressed. Ultimately, item 110 is routed in delivery system 130 to the plant that serves the delivery address indicated on item 110, according to established procedures. Thus item 110 is routed from plant to plant within delivery system 130 wherein item 110 efficiently converge on first address plant 140, which is the plant that serves the delivery address labeled on the item 110. Throughout this process, delivery system 130 tracks the progress of item 110 through delivery system 130.

Once item 110 is placed in delivery system 130 directed toward buyer 155 with tracking indicia 120 attached to item 110 in stage 415, exemplary subroutine 220 continues to stage 420 and returns to exemplary subroutine 230 of FIG. 2.

Payment is Made

FIG. 5 describes exemplary subroutine 230 from FIG. 2 in which a payment is made for at least one of the following: the purchase price of item 110, the delivery fee, and the fee for any other buyer-selected delivery-related services. Exemplary subroutine 230 begins at starting block 505 and advances to stage 510 where tracking indicia 120, which identifies the sales transaction and is placed on item 110, is read when item 110 is delivered to buyer 155.

After tracking indicia 120 is read, exemplary subroutine 230 advances to decision block 515 where it is determined if the payment included the purchase price. If it is determined that the payment included the purchase price in decision block 515, exemplary subroutine 230 advances to decision block 535 where it is determined if the payment included a delivery fee. Decision block 535 will be discussed in greater detail below.

If at decision block 515 it is determined, however, that the payment did not include the purchase price, exemplary subroutine 230 advances to decision block 520 where it is determined if buyer 155 wishes to return item 110. If buyer 155 wishes to return item 110 in decision block 520, exemplary subroutine 230 advances to stage 525 where the purchase price of item 110 is released from the escrow account to buyer 155. After the purchase price of item 110 is released from the escrow account to buyer 155 in stage 525, exemplary subroutine 230 advances to decision block 535 where it is determined if the payment included a delivery fee. Decision block 535 will be discussed in greater detail below.

If it is determined however, that buyer 155 does not wish to return item 110 in decision block 520, exemplary subroutine 230 advances to stage 530 where the purchase price of item 110 is released from the escrow account to seller 105. From stage 530, exemplary subroutine 230 advances to decision block 535, where it is determined if the payment included the delivery fee. If it is determined that the payment included the delivery fee in decision block 535, exemplary subroutine 230 advances to stage 540 where the delivery fee of item 110 is released from the escrow account to the delivery system operator.

Once the delivery fee of item 110 is released from the escrow account to the delivery system operator in stage 540 or if it is determined that the payment did not include the delivery fee in decision block 535, exemplary subroutine 230 advances to decision block 545 where it is determined if payment included any other buyer-selected delivery-related services. If it is determined that payment included any other buyer-selected delivery-related services in block 545, exemplary subroutine 230 advances to stage 550 where the fee for any other buyer-selected delivery-related services of item 110 is released from the escrow account to the delivery system operator.

Once the fee for any other buyer-selected delivery-related services of item 110 is released from the escrow account to the delivery system operator in stage 550 or if it is determined that payment did not include any other buyer-selected delivery-related services in decision block 545, exemplary subroutine 230 continues to stage 555 and returns to stage 240 of FIG. 2.

Alternate Embodiment of Arrangement of Sales Transaction

FIG. 3B describes exemplary subroutine 210' which is an alternate embodiment of exemplary subroutine 210 from FIG. 2 in which a sales transaction of item 110 between seller 105 and buyer 155 is arranged over communications system 170. Exemplary subroutine 210' begins at starting block 305' and advances to stage 310' where a receipt is sent to buyer 155 identifying the sales transaction and payment amount. For example, the receipt may comprise a bar coded label sent from person-to-person system 185 to buyer 155 via e-mail over communications system 170. The bar coded label may contain data identifying the sales transaction and relating the seller 105 and buyer 155.

After the receipt is sent to buyer 155 identifying the sales transaction and payment amount in stage 310', exemplary subroutine 210' advances to stage 315' where the escrow account is credited in the amount of the payment when buyer 155 pays the amount of the payment at a retail unit. Continuing the previously mentioned example, the buyer 155 may take the receipt comprising the bar coded label to the retail unit comprising a convenience store, an automated teller machine, or a retail store operated by the delivery system operator. Those skilled in the art will appreciate that many other types of retail units may be utilized. Once at the retail unit, the receipt may be scanned and payment may be tendered. This transaction is reported and the collected payment is sent to person-to-person system 185. With the payment received, the escrow account is credited in the amount of the payment. The reporting of this transaction may be performed via communication systems 170.

Once the escrow account is credited in the amount of the payment when buyer 155 pays the amount of the payment at the retail unit in stage 315', exemplary subroutine 210' continues to stage 320' and returns to exemplary subroutine 220 of FIG. 2.

Alternative Embodiment of Providing Item Sales and Delivery Service

Figure 6:
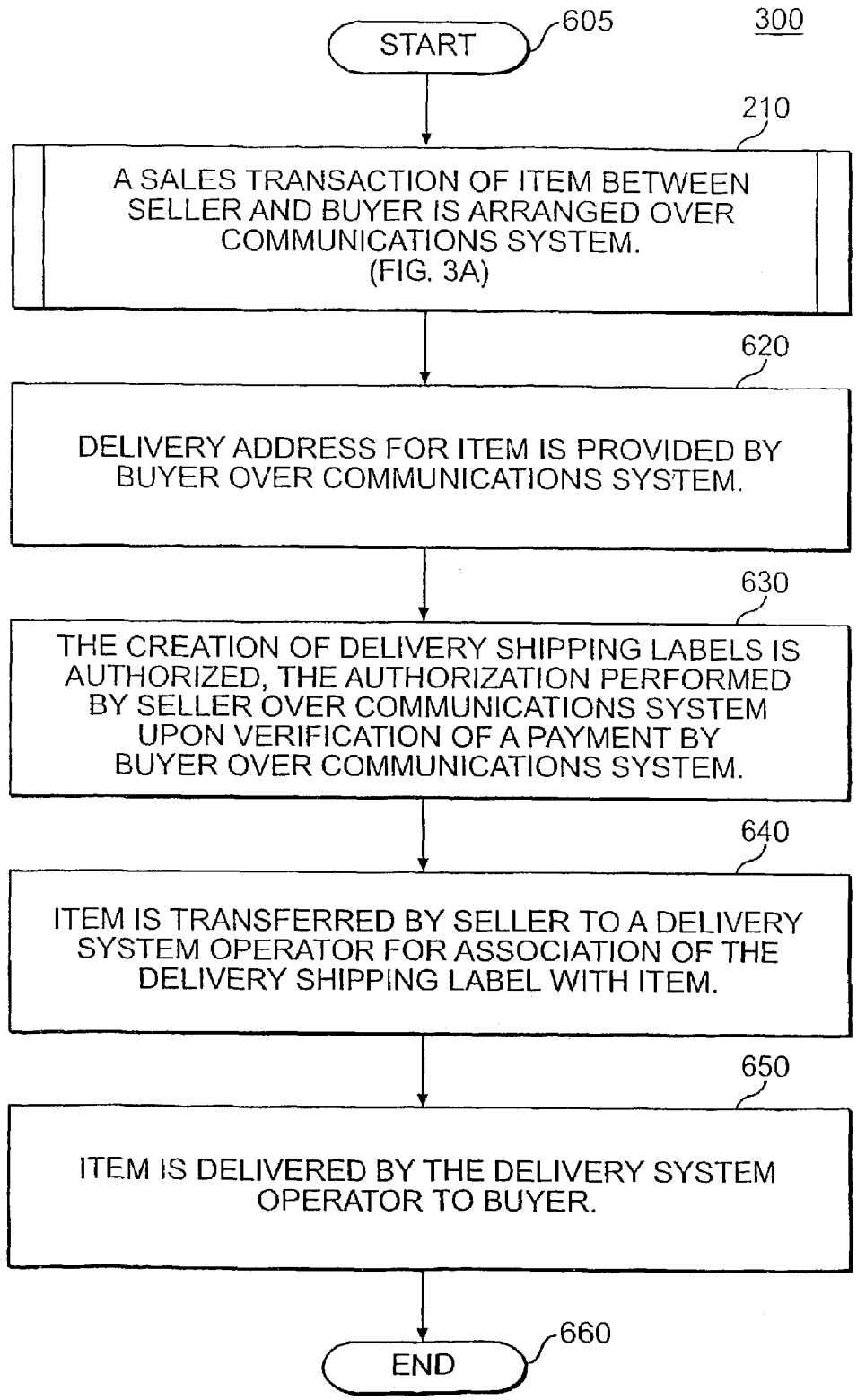
FIG. 6 is a flow chart of an alternative embodiment of the exemplary method of FIG. 2 for providing item sales and delivery service consistent with the present invention.

FIG. 6 is a flow chart setting forth the general stages involved in an exemplary method 300 for providing item sales and delivery service. Method 300 is an alternative embodiment of method 200 as shown in FIG. 2 and discussed above. The implementation of stages of exemplary method 300 in accordance with an exemplary embodiment of the present invention have been described in detail in FIG. 3A and FIG. 3B above. Exemplary method 300 begins at starting block 605 and proceeds to exemplary subroutine 210 where the sales transaction of item 110 between seller 105 and buyer 155 is arranged over communications system 170. The stages of exemplary subroutine 210 are shown in FIG. 3A and the stages of an alternative embodiment of subroutine 210, subroutine 210', are shown in FIG. 3B. The stages of these subroutines have been described in great detail above.

From exemplary subroutine 210 where the sales transaction of item 110 between seller 105 and buyer 155 is arranged over communications system 170, exemplary method 300 advances to stage 620 where the delivery address for item 110 is provided by buyer 155 over communications system 170. When the internet is used as communications system 170, the buyer 155 may send an e-mail containing first address 150 to seller 105, or buyer 155 may send this information to person-to-person system 185 which may in turn forward the information to seller 105.

Once the delivery address for item 110 is provided by buyer 155 over communications system 170 in stage 620, exemplary method 300 continues to stage 630 where the creation of delivery shipping labels is authorized, the authorization performed by seller 105 over communications system 170 upon verification of the payment by buyer 155 over communications system 170. These delivery shipping labels may comprise label 115 and return address 107 and may be authorized using internet e-mail as communications system 170. After the creation of delivery shipping labels is authorized in stage 630, exemplary method 300 advances to stage 640 where item 110 is transferred by seller 105 to the delivery system operator for association of the delivery shipping label with item 110.

From stage 640 where item 110 is transferred by seller 105 to the delivery system operator for association of the delivery shipping label with item 110, exemplary method 300 advances to stage 650 where item 110 is delivered by the delivery system operator to buyer 155. Delivery system 130 comprises seller plant 125, delivery path 135, first address plant 140 and alternative address plant 145. Delivery path 135 comprises a plurality of plants similar to seller plant 125, first address plant 140 and alternative address plant 145. The plants within delivery system 130 may contain, among other things, automated systems and sorting equipment located at a plurality of locations. In executing their function, the plants comprising delivery system 130 process item 110 by checking address label 115 placed on item 110. Item 110 is then routed to the next most appropriate plant in delivery system 130. The appropriateness of the next plant in delivery system 130 depends upon the present location of item 110 in delivery system 130 and where item 110 is addressed. Ultimately, item 110 is routed in delivery system 130 to the plant that serves the delivery address indicated on item 110, according to established procedures. Thus item 110 is routed from plant to plant within delivery system 130 wherein item 110 efficiently converge on first address plant 140, which is the plant that serves the delivery address labeled on the item 110. Throughout this process, delivery system 130 tracks the progress of item 110 through delivery system 130. Once item 110 is delivered by the delivery system operator to buyer 155 in stage 650, exemplary method 300 ends at stage 660.

In view of the foregoing, it will be appreciated that the present invention provides a system and method for item sales and delivery service. Still, it should be understood that the foregoing relates only to the exemplary embodiments of the present invention, and that numerous changes may be made thereto without departing from the spirit and scope of the invention as defined by the following claims.

I claim:

1. A method for providing item sales and delivery service, comprising:

generating a tracking indicia which identifies a sales transaction;

attaching the tracking indicia to an item;

directing the item through a delivery system toward a buyer based on the tracking indicia;

determining, by a computer, based on the tracking indicia, if a payment by the buyer to an escrow account included a purchase price of the item;

releasing funds for the purchase price from the escrow account when the determination is positive; and releasing funds from the escrow account to a delivery system operator for at least one of a delivery fee or a fee for any other buyer-selected delivery service based on the tracking indicia.

2. The method of claim 1, further comprising:

receiving authorization from the buyer to transfer the payment from a buyer account for the purchase of the item;

debiting the buyer account in an amount of the payment; and crediting the escrow account in the amount of the payment.

3. The method of claim 2, further comprising debiting the buyer account by at least one of the following: billing the buyer, debiting buyer's checking account, debiting buyer's credit card account, debiting buyer's debit card account, and receiving cash from the buyer.

4. The method of claim 1, further comprising:

sending to the buyer a receipt identifying the sales transaction and an amount of the payment; and crediting an escrow account in the amount of the payment when the buyer pays the amount of the payment at a retail unit.

5. The method of claim 1, wherein releasing funds for the purchase price comprises releasing funds for the purchase price of the item from the escrow account to a seller if the determination is positive and the buyer does not want to return the item;

releasing the delivery fee of the item from the escrow account to the delivery system operator if the payment included the delivery fee; and releasing a fee for any other buyer-selected delivery-related services of the item from the escrow account to the delivery system operator if the payment included the fee for any other buyer-selected delivery-related services.

6. The method of claim 1, wherein
releasing funds for the purchase price comprises releasing funds for the purchase price of the item from the escrow account to the buyer if the determination is positive and the buyer decides to return the item to the seller;
releasing the delivery fee of the item from the escrow account to the delivery system operator if the payment included the delivery fee; and
releasing a fee for any other buyer-selected delivery-related services of the item from the escrow account to the delivery system operator if the payment included the fee for any other buyer-selected delivery-related services.

7. The method of claim 1, further comprising arranging the sales transaction over a communications system utilizing at least one of the following media: regular mail, e-mail, facsimile, internet, and an interactive voice response method.

8. The method of claim 1, further comprising processing the item, wherein the item comprises a mailpiece, a priority mail package, or an express mail package.

9. The method of claim 1, wherein the tracking indicia comprises at least one of a bar code or an identifier code.

10. A system for providing item sales and delivery service, comprising:
a component for generating a tracking indicia which identifies a sales transaction;
a component for attaching the tracking indicia to an item;
a component for directing the item through a delivery system toward a buyer based on the tracking indicia;
a component for determining, based on the tracking indicia, if a payment by the buyer to an escrow account included a purchase price of the item;
a component for releasing funds for the purchase price from the escrow account when the determination is positive; and
a component for releasing funds from the escrow account to a delivery system operator for at least one of a delivery fee or a fee for any other buyer-selected delivery service based on the tracking indicia.

11. The system of claim 10, further comprising:
a component for receiving authorization from the buyer to transfer the payment from a buyer account for the purchase of the item;
a component for debiting the buyer account in an amount of the payment; and
a component for crediting an escrow account in an amount of the payment.

12. The system of claim 11, wherein the component for debiting the buyer account comprises at least one of a component for billing the buyer, a component for debiting buyer's checking account, a component for debiting buyer's credit card account, a component for debiting buyer's debit card account, or a component for receiving cash from the buyer.

13. The system of claim 10, further comprising:
a component for sending to the buyer a receipt identifying the sales transaction and an amount of the payment; and
a component for crediting an escrow account in the amount of the payment when the buyer pays the amount of the payment at a retail unit.

14. The system of claim 10, wherein the component for releasing the funds for the purchase price releases the funds to a seller if the determination is positive and the buyer wants to keep the item.

15. The system of claim 10, wherein the component for releasing the funds for the purchase price releases the funds to a buyer if the determination is positive and the buyer decides to return the item to the seller.

16. The system of claim 10, further comprising a component for arranging the sales transaction over a communications system utilizing at least one of regular mail, e-mail, facsimile, internet, or an interactive voice response system.

17. The system of claim 10, wherein the item comprises a mailpiece, a priority mail package, or an express mail package.

18. The system of claim 10, wherein the tracking indicia comprises at least one of a bar code or an identifier code.

19. A method for providing item sales and delivery service, comprising:
generating a tracking indicia which identifies a sales transaction;
attaching the tracking indicia to an item;
providing a delivery address for the item from a buyer;
providing authorization from a seller to create delivery shipping labels, wherein the seller provides authorization upon verification of a payment by the buyer;
transferring the item from the seller to a delivery system operator for association of the delivery shipping label with the item;
determining, by a computer, based on the tracking indicia if a payment by the buyer to an escrow account included a purchase price of the item;
releasing funds for the purchase price from the escrow account when the determination is positive; and
releasing funds from the escrow account to a delivery system operator for at least one of a delivery fee or a fee for any other buyer-selected delivery service based on the tracking indicia.

20. The method of claim 19, further comprising:
receiving authorization from the buyer to transfer the payment from a buyer account for the purchase of the item;
debiting the buyer account in an amount of the payment; and
crediting the escrow account in the amount of the payment.

21. The method of claim 20, further comprising debiting the buyer account by at least one of billing the buyer, debiting buyer's checking account, debiting buyer's credit card account, debiting buyer's debit card account, or receiving cash from the buyer.

22. The method of claim 19, further comprising:
sending to the buyer a receipt identifying the sales transaction and the payment amount; and
crediting the escrow account in the amount of the payment when the buyer pays the amount of the payment at a retail unit.

23. The method of claim 19, further comprising arranging the sales transaction over a communications system utilizing at least one of regular mail, e-mail, facsimile, internet, or an interactive voice response method.

24. The method of claim 19, further comprising placing the item in a mailpiece, a priority mail package, or an express mail package.

25. The method of claim 19, further comprising processing the payment comprising at least one of a purchase price of the item, a delivery fee, or a fee for a buyer-selected delivery-related service.

26. The method of claim 19, further comprising delivering the item by the delivery system operator to the buyer.

27. A system for providing item sales and delivery service, comprising:
a component for generating a tracking indicia which identifies a sales transaction and attaching the tracking indicia to an item;

a component for providing a delivery address for the item from a buyer;

a component for providing authorization from a seller to create delivery shipping labels, wherein the seller provides authorization upon verification of a payment by the buyer;

a component for transferring the item from the seller to a delivery system operator for association of the delivery shipping label with the item;

a component for determining, based on the tracking indicia, if a payment by the buyer to an escrow account included a purchase price of the item;

a component for releasing funds for the purchase price from the escrow account when the determination is positive; and a component releasing funds from the escrow account to a delivery system operator based on the tracking indicia.

28. The system of claim 27, wherein further comprising:

a component for receiving authorization from the buyer to transfer the payment from a buyer account for the purchase of the item;

a component for debiting the buyer account in an amount of the payment; and a component for crediting the escrow account in the amount of the payment.

29. The system of claim 28, wherein debiting the buyer account comprises at least one of billing the buyer, a buyer's checking account, a buyer's credit card account, a buyer's debit card account, or receiving cash from the buyer.

30. The system of claim 27, further comprising:

a component for sending to the buyer a receipt identifying the sales transaction and the payment amount; and a component for crediting the escrow account in the amount of the payment when the buyer pays the amount of the payment at a retail unit.

31. The system of claim 27, further comprising a component for arranging the sales transaction over a communications system utilizing at least one of regular mail, e-mail, facsimile, internet, or an interactive voice response method.

32. The system of claim 27, wherein the item is placed in a mailpiece, a priority mail package, or an express mail package.

33. The system of claim 27, wherein the payment comprises at least one of a purchase price of the item, a delivery fee, or a fee for a buyer-selected delivery-related service.

34. The system of claim 27, further comprising a component for delivering the item by the delivery system operator to the buyer.

35. A method for providing item sales and delivery service, comprising:

making a payment to an escrow account related to a sales transaction;

generating a tracking indicia which identifies the sales transaction;

attaching the tracking indicia to an item;

directing the item through a delivery system to a buyer based on the tracking indicia;

determining, by a computer, based on the tracking indicia, if a payment by the buyer to an escrow account included a purchase price of the item; and releasing funds for the purchase price from the escrow account when the determination is positive.

36. The method of claim 35, further comprising receiving authorization from a seller to create a delivery shipping label for the item.

37. The method of claim 36, wherein the delivery shipping label comprises a return address.

38. A system for providing item sales and delivery service, comprising:

a component for making a payment to an escrow account related to a sales transaction;

a component for generating a tracking indicia which identifies the sales transaction;

a component for attaching the tracking indicia to an item;

a component for directing the item through a delivery system to a buyer based on the tracking indicia;

a component for determining, based on the tracking indicia, if a payment by the buyer to an escrow account included a purchase price of the item; and a component for releasing funds for the purchase price from the escrow account when the determination is positive.

39. The system of claim of claim 38, wherein the delivery shipping label comprises a return address.

40. The system of claim 38, further comprising a component for receiving authorization from a seller to create a delivery shipping label for the item.

* * * * *

UNITED STATES PATENT AND TRADEMARK OFFICE
CERTIFICATE OF CORRECTION

PATENT NO. : 7,487,113 B2 Page 1 of 1
APPLICATION NO. : 10/344993
DATED : February 3, 2009
INVENTOR(S) : Christine R. L. Ray It is certified that error appears in the above-identified patent and that said Letters Patent is hereby corrected as shown below:

In claim 39, col. 14, line 39, "of claim of claim" should read --of claim--.

In claim 39, col. 14, line 39, "claim 38" should read --claim 40--.

Signed and Sealed this

Fifth Day of May, 2009

JOHN DOLL
*Acting Director of the United States Patent and Trademark Office*